United States Patent [19]
Hall et al.

[11] Patent Number: 4,880,201
[45] Date of Patent: Nov. 14, 1989

[54] CONSTANT NATURAL FREQUENCY, MECHANICAL SPRING SEAT SUSPENSION

[75] Inventors: Garth O. Hall; Harvey N. Tengler, both of New Berlin, Wis.

[73] Assignee: Bostrom Seating, Inc., Cudahy, Wis.

[21] Appl. No.: 128,033

[22] Filed: Dec. 3, 1987

[51] Int. Cl.⁴ ............................................. F16M 13/00
[52] U.S. Cl. .................................... 248/575; 248/421; 248/588; 248/608; 297/345
[58] Field of Search ............... 248/588, 590, 608, 421, 248/575; 297/304, 345

[56] References Cited

U.S. PATENT DOCUMENTS

| | | | |
|---|---|---|---|
| 2,204,894 | 6/1940 | Johnson | 248/421 |
| 2,675,985 | 4/1954 | Boiteux | 248/608 X |
| 3,109,621 | 11/1963 | Simons et al. | 248/608 X |
| 3,140,851 | 7/1964 | Bilancia | 248/608 X |
| 3,301,520 | 1/1967 | Barth et al. | 248/608 X |
| 3,774,963 | 11/1973 | Lowe | 248/608 X |
| 4,077,596 | 3/1978 | Pinaire et al. | 248/575 |

FOREIGN PATENT DOCUMENTS

| | | | |
|---|---|---|---|
| 2359326 | 6/1975 | Fed. Rep. of Germany | 248/608 |
| 2539332 | 3/1976 | Fed. Rep. of Germany | 248/575 |

Primary Examiner—Reinaldo P. Machado
Assistant Examiner—David L. Talbott
Attorney, Agent, or Firm—Andrus, Sceales, Starke & Sawall

[57] ABSTRACT

A suspension system has a base, mountable to the floor of a vehicle, and a frame above the base. The base and frame are coupled by a linkage, for example two, spaced pairs of crossed links. A mechanical spring, preferably in the form of a torsion bar, is mounted in one of the base and frame. A lever is coupled to the spring means. A roller assembly mounted in the links is movable along the lever arm to vary its length and to act as a fulcrum. The lever has a cam lobe so that movement of the roller assembly arcuately moves the torsion bar to preload same, as the length of the lever arm is altered. Varying the length of the lever arm and the preloading of the spring responsive to differing occupant's weights maintains constant natural frequency and centers the suspension system in the ride zone.

15 Claims, 3 Drawing Sheets

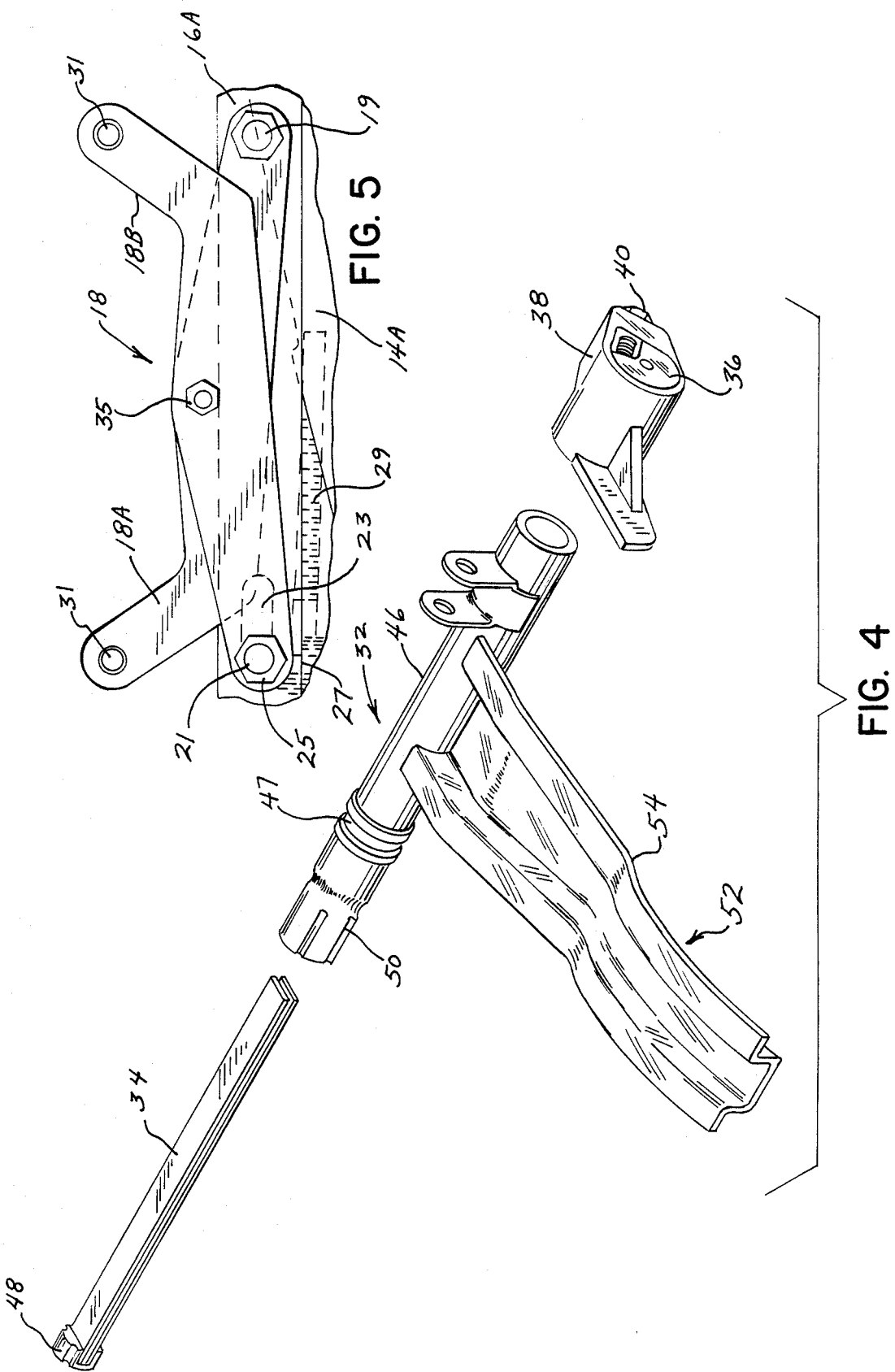

CONSTANT NATURAL FREQUENCY, MECHANICAL SPRING SEAT SUSPENSION

The present invention relates to improvements in vehicle seat suspensions and more particularly to a mechanical spring seat suspension that exhibits an essentially constant natural frequency regardless of the weight of the occupant of the seat.

In trucks or other vehicles, a suspension system is interposed between the vehicle and the seat occupied by the driver. The suspension system reduces the impacts and vibration experienced by the driver during movement of the vehicle. The suspension system typically employs springs or other resilient means for this purpose.

In a suspension system, it is desirable to have a constant natural frequency so that every occupant, regardless of his/her weight, obtains the same vibration isolation characteristics from the suspension system. The formula for natural frequency is $$f_n = \tfrac{1}{2}\pi \sqrt{\frac{K \cdot g}{W}}$$

where:
$f_n$ = natural frequency in hertz
$W$ = weight of the occupant in pounds
$K$ = spring rate of the suspension system in pound/inch
$g$ = acceleration produced by gravity in inches/sec/sec The spring rate K is a measure of the deflection of the resilient suspension system for a given applied load. For example, a suspension system that deflects ten inches under a load of 100 pounds has a spring rate of 10 pounds/inch. The spring rate may also be termed the coefficient of stiffness or the force constant of the spring.

It will be appreciated from the above formula that, in order to obtain constant natural frequency, it is necessary for the spring rate K to vary in accordance with the weight W of the seat occupant.

Typical mechanical springs exhibit a constant spring rate rather than the variable spring rate required for a constant natural frequency system, i.e. for a typical mechanical spring, if a force of 100 pounds deflects a mechanical spring 10 inches, a force of 200 pounds will deflect it 20 inches, and so on. This means that suspension systems employing such springs do not present the desired constant natural frequency to seat occupants of different weight.

Air springs, on the other hand, can provide the variable spring rate needed for constant natural frequency. Thus, when more air is placed in the spring to compensate for increased occupant weight, the spring rate is correspondingly varied so that the natural frequency remains the same. In the past, air springs, for example those of the so-called "rolling lobe" type, have therefore been used where such property is desired.

However, air springs, and the attendant pressurizing apparatus, are complex and bulky in construction, leading to increased cost in manufacture, installation, and operation. This is undesirable.

It is therefore the object of the present invention to provide a vehicle seating suspension system that incorporates a simple and economical mechanical spring, while at the same time is capable of providing constant natural frequency properties to the suspension system for occupants of different weight.

Another object of the present invention is to provide such a suspension system that is easy to adjust to provide the constant natural frequency property and to position the suspension system in a desirable manner for occupants of different weights. This enables the suspension system to be centered in its range of movement, commonly termed the "ride zone". Maintaining constant natural frequency and centering in the ride zone may be carried out by a single adjustment.

A further object is to provide such a suspension system that can be built into a low profile suspension system, thereby permitting use of the system in a large number of applications, including those in which there is a small distance between the seat and the floor of the vehicle.

Briefly, the present invention contemplates a suspension system having a base means and a frame means coupled by linkage means, such as two pairs of crossed links. When so configured, the links of the pair each have one end rotatably mounted in one of the base or frame means and the other end slidable along the frame or base means. A mechanical spring means, preferably in the form of a torsion bar spring, is mounted in one of the base means and frame means. A lever is coupled to the spring means. A roller assembly is movable along the lever arm to vary its length. Varying the length of the lever arm responsive to differing occupant's weights assists in varying the spring rate of the torsion bar to maintain constant natural frequency.

To provide a compact design to the suspension system of the present invention, the roller assembly may be slidably mounted in the linkage means. Means, such as a lobe on the lever arm, are provided for preloading the torsion bar as the length of the lever arm is altered. This further assists in varying the spring rate of the torsion bar as the roller assembly is moved along slanting, crossed links. Preloading the torsion bar also alters the supporting force to position the suspension system in the center of the ride zone for occupants of different weights.

The present invention will be further understood by reference to the accompanying drawings in which:

FIG. 4 is an exploded view of the mechanical spring and actuator; and

FIG. 5 is a side view of a height adjustment mechanism of the suspension system of the present invention.

Figure 1:
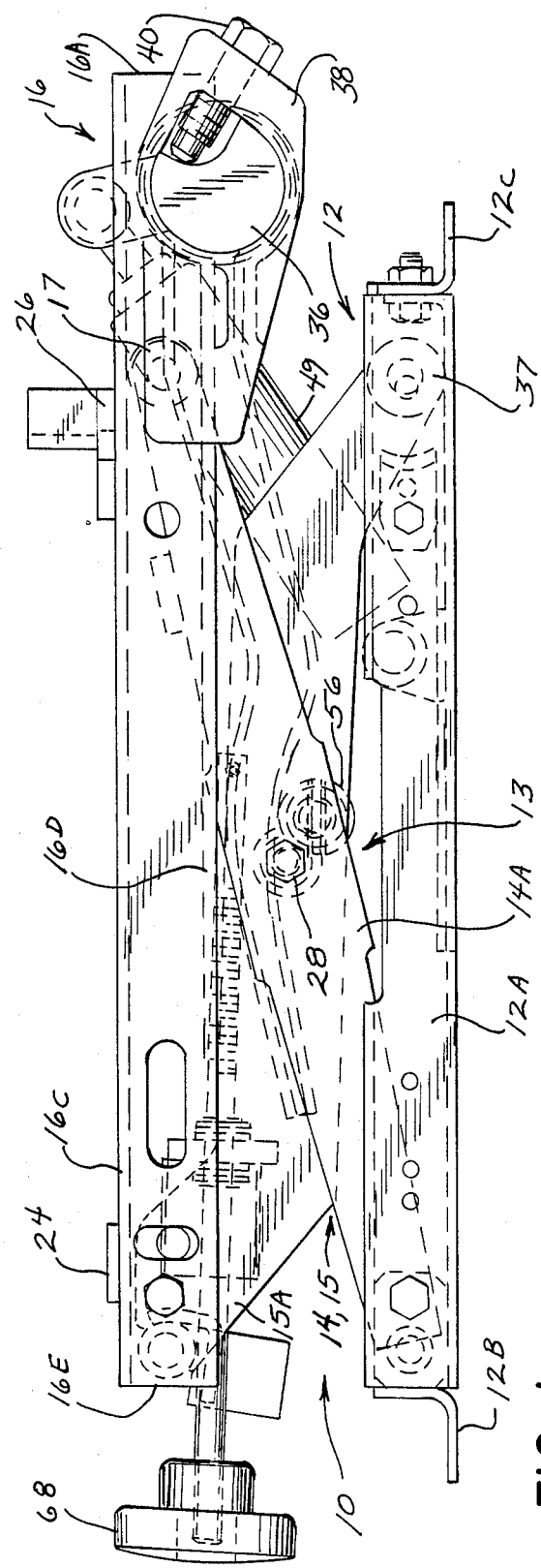
FIG. 1 is a side view of the improved mechanical spring seat suspension of the present invention.

Suspension system 10 of the present invention includes base means 12 connected by a linkage means 13 to an upper frame means 16. Frame means 16 may contain a height adjustment mechanism 18 for the seat for the vehicle occupant, shown in detail in FIG. 5.

Base means 12 includes a pair of spaced side members, one of which is shown as 12A in FIG. 1 and a pair of end members 12B and 12C. The base side members may comprise channel members, U-shaped in cross section, opening to the interior of the suspension system and toward each other. The end members contain holes 22 by which the suspension system may be bolted to the vehicle.

Upper frame means 16 includes a pair of spaced side members 16A and 16B. Upper side members 16A and 16B may be channel members, U-shaped in cross section, each having an upper flange 16C, a lower flange 16D, and an outer side flange 16E. The channel shaped members open into the interior of the suspension and toward each other. Upper side members 16A and 16B are connected at one end by bar 24 and at the other end by bar 26.

Linkage means 13 may include crossed links 14 and 15. Link 14 comprises spaced links 14A and 14B extending from the spaced side members of base means 12 to the spaced upper side members of frame means 16. Links 14A and 14B are generally straight in configuration. Links 14A and 14B slant upwardly to the right. The lower ends of links 14A and 14B are pivotally mounted in base means 12. The upper ends of links 14A and 14B contain rollers 17 that roll along upper side members 16A and 16B on the under side of flanges 16C. Links 14A and 14B may be joined by tie bar 42. Links 15A and 15B also extend from base 12 to upper side members 16A and 16B. For a purpose hereinafter described, links 15A and 15 have generally straight central portions and oppositely bent, end portions. Links 15A and 15B slant upwardly to the left. The upper end of links 15A and 15B are pivotally mounted in upper member 16. The lower ends of links 15A and 15B contain rollers 37 positioned in the channel members and that roll along the side members of base means 12. Bolts 28 and 30 connect links 14A and 15A and 14B and 15B together in their central portions.

Figure 3:
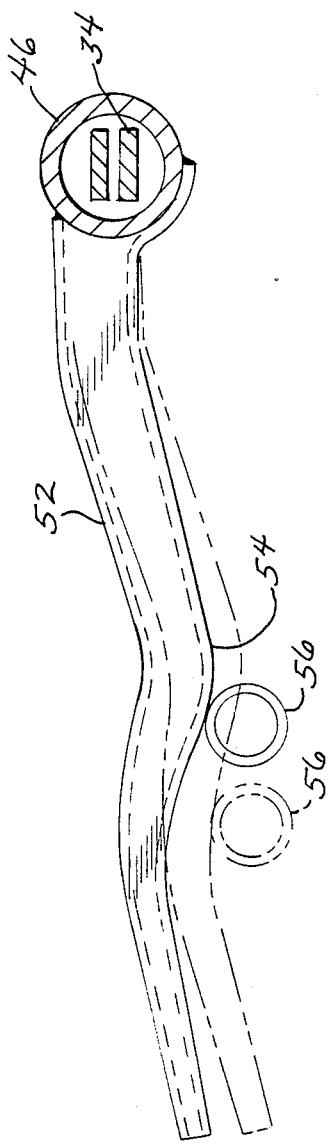
FIG. 3 is a view of the mechanical spring and actuator mechanism taken along the line 3—3 of FIG. 2.
Figure 2:
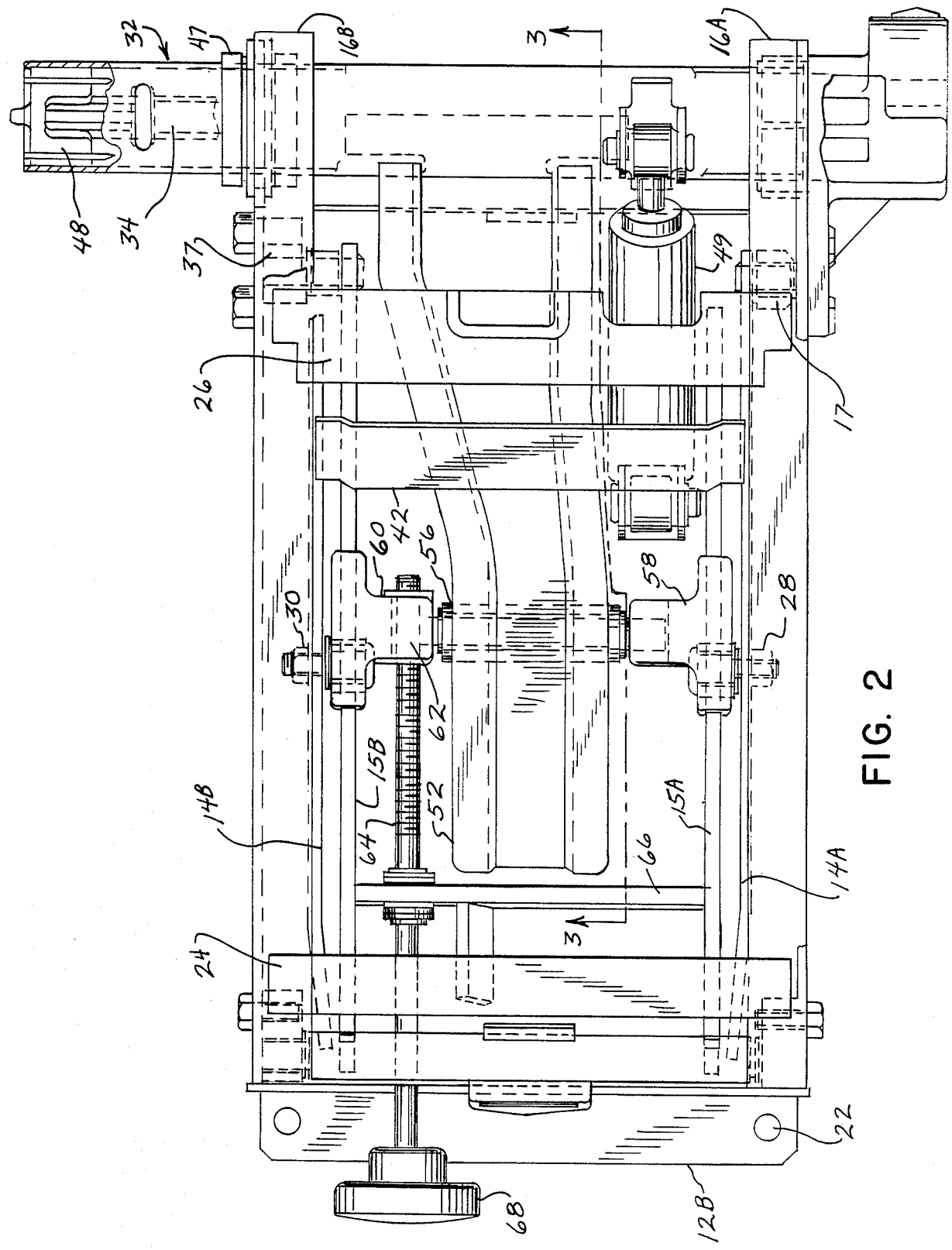
FIG. 2 is a top plan view, partially broken away, of the suspension system.

In suspension system 10, the mechanical spring comprises a torsion bar assembly 32 shown in detail in FIGS. 3 and 4. Assembly 32 includes a torsion bar spring 34 formed of a plurality of individual bars for ease of fabrication. One end of torsion bar 34 is anchored in fitting 36. Fitting 36 is mounted in bracket 38 and held in the desired position against rotation, when the spring is flexed, by bolt 40. Bracket 38 is non-rotatably fastened to upper side member 16A as shown in FIG. 1 as by welding. Torsion bar 34 is surrounded by torsion tube 46. The other end of torsion bar 34 is mounted in fitting 48 that is captured by spline 50 in torsion tube 46. The rotation of torque tube 46 with respect to upper frame member 16 results in the twisting or torsion of bar 34. Collar 47 may be provided on torque tube 46 to facilitate the rotation. A damping cylinder 49 extends between torque tube 46 and base means 12 to dampen rotary movement of the torque tube.

Lever arm 52 is mounted on torque tube 46 to extend between links 14, 15. Lever arm 52 has a lobe or cam 54 on the lower side of the central portion thereof.

Roller 56 slidably mounted on links 15A and 15B, engages lever 52 in the manner of a fulcrum. Slides 58 and 60 are mounted on links 15A, 15B, respectively, to slide along the upper surfaces of the straight central portion of the links. Roller 56 extends between slides 58 and 60. Slide 60 contains nut 62 that engages lead screw 64. Lead screw 64 is journalled in bar 66 spanning links 15A, 15B and is rotatable by knob 68 or other appropriate means to move slides 58 and 60 and roller 56 along the lever arm 52.

The operation of suspension system 10 of the present invention is as follows. As noted above, in order to maintain constant natural frequency in suspension system 10, it is necessary that the ratio of the load (i.e. occupant weight W) to spring rate K remain constant. If occupant weight (W) increases, the spring rate K must correspondingly increase. Thus, in the example given above, where occupant weight is 100 pounds and the spring rate K is 10 pounds/inch, the ratio of K to W is 0.1. To maintain constant natural frequency if occupant weight increases to 200 pounds, the spring rate must increase to 20 pounds/inch to maintain the K/W ratio constant at 0.1 and constant natural frequency to suspension system 10. In the common sense, the properties of the suspension system must become "stiffer" for the heavier occupant.

If size of the suspension system and ride zone centering were of no consideration, it would be possible to control spring rate by simply varying the lever arm length of lever 52 by means mounted on the base of the suspension system or elsewhere. Thus, for lighter loads, the arm of lever 52 between roller 56 and torsion bar 34 would be increased by moving roller 56 to the left in FIG. 1 and in FIG. 3. This would decrease the effective spring rate of torsion bar 34. For heavier occupants, the arm of lever 52 between roller 56 and torsion bar 34 would be decreased by moving roller 56 to the right in FIG. 1 and in FIG. 3. This would increase the effective spring rate of torsion bar 34.

The present invention utilizes links 15A and 15B to mount roller 56, thereby providing a desirable low profile to the suspension system and permitting use of the suspension system in a large number of applications. However, this limits the range of arcuate movement afforded to lever 52.

It is also desirable to permit adjustment of the suspension system to the center of its range of movement, or ride zone, for occupants of any weight. This insures that the suspension system will not bottom out or top out in normal use.

Further, it is desirable to both maintain constant natural frequency and centering in the ride zone with a single adjustment. For the foregoing reasons, lever 52 contains lobe 54 that angularly moves lever 52, in the manner shown in FIG. 3, as roller, 56 moves along the lever so as to preload torsion bar 32. Varying the preloading of torsion bar 34 varies the force available to support the weight of the occupant and allows the occupant to center the suspension system in the ride zone by rotating knob 68 that moves roller 56. An indicator may be provided to indicate to the occupant when rotation of knob 68 has moved suspension system 10 to the center of its ride zone. Varying the lever length while simultaneously varying the preloading, maintains the constant natural frequency properties of suspension system 10.

There has thus been provided an improved suspension system that incorporates a simple, economical mechanical spring, while at the same time exhibiting constant natural frequency properties to occupants of different weight. The suspension system is compact, low in profile, and can be easily adjusted to center the suspension system in the ride zone.

The compactness, low profile, and adjustability of the suspension system of the present invention are also enhanced by the height adjustment mechanism 18 for the occupant's seat shown in FIG. 5. Height adjustment mechanism 18 is mounted on upper frame means 16. Height adjustment mechanism 18 may include two pairs of somewhat L-shaped levers of which levers 18A and 18B are shown in FIG. 5. An end of lever 18A is pivotally mounted on upper frame side member 16A by bolt 19. An end of lever 18B is mounted on bar 21 mounted in slot 23 in side member 16A. Bar 21 is retained in slot 23 by nut 25. Lead nut 27 is also mounted on bar 21 to receive rotatable lead screw 29 journalled in upper members 16. Levers 18 and 18B are joined in the central portion by bolt 35. The seat for the occupant is mounted on height adjustment mechanism 18 by fasteners extending through holes 31 in the ends of levers 18A and 18B. Rotating lead screw 29 raises or lowers the ends of levers 18A and 18B and thus the occupant's seat.

Various modes of carrying out the invention are contemplated as being within the scope of the following claims particularly pointing out and distinctly claiming the subject matter which is regarded as the invention.

We claim:

1. A seat suspension system in which the spring rate (K) of a spring means may be varied in accordance with the applied load (W) so as to render the quantity (K/W) constant and cause the system to exhibit a constant natural frequency with different loads applied to the system, said system comprising:
   base means;
   frame means suitable for receiving the load applied to the system;
   linkage means extending between said base means and frame means for joining said base means and frame means together while permitting relative vertical movement between said base means and frame means, said linkage means comprising two spaced pairs of crossed links;
   mechanical spring means mounted on one of said base means and frame means;
   a lever coupled to said spring means for loading said spring means by arcuate movement of said lever; and
   fulcrum means slidably mounted on said linkage means and engaging said lever, said fulcrum means being movable with respect to said lever for altering the spring rate (K) of said spring means in accordance with the applied load (W) to maintain the quantity (K/W) constant.

2. The suspension system according to claim 1 wherein said fulcrum means is further defined as coacting with said lever such that movement of said fulcrum means causes arcuate movement of said lever and preloading of said spring means.

3. The suspension system according to claim 1 wherein said fulcrum means is further defined as movable along said lever for altering the length of the arm of said lever.

4. The suspension system according to claim 2 wherein said fulcrum means is further defined as coacting with said lever such that movement of said fulcrum means causes arcuate movement of said lever and preloading of said spring means.

5. The suspension system according to claim 3 further including preloading means operatively associated with at least one of said lever or fulcrum means for arcuately moving said lever responsive to movement of said fulcrum means to preload said spring means.

6. The suspension system according to claim 1 further including preloading means operatively associated with at least one of said lever or fulcrum means for arcuately moving said lever responsive to movement of said fulcrum means to preload said spring means.

7. The suspension system according to claim 6 wherein said lever is so formed as to include said preloading means.

8. The suspension system according to claim 7 wherein said lever contains cam means engageable with said fulcrum means.

9. The suspension system according to claim 1 wherein said linkage means is further defined as having adjacent members of said links joined together in a manner permitting relative rotation between said links, the links of said pairs having one end rotatably mounted in one of said base means or frame means and the other end slidable along the other of said frame means or base means.

10. The suspension system according to claim 1 wherein said mechanical spring means is of the torsion bar type having one end mounted in said base means or frame means and the other end coupled to said lever.

11. The suspension system according to claim 1 wherein said spring means is mounted on said frame means.

12. The suspension system according to claim 1 wherein said frame means includes means for mounting a seat receiving the load applied to the suspension system.

13. The suspension according to claim 12 wherein said seat mounting means is adjustable in height.

14. The suspension system according to claim 13 wherein said seat mounting means comprises an additional linkage means having two, spaced pairs of generally L-shaped crossed links.

15. A seat suspension system in which the spring rate (K) of a spring means may be varied in accordance with the applied load (W) so as to render the quantity (K/W) constant and cause the system to exhibit a constant natural frequency with different loads applied to the system, said system comprising:
   base means;
   frame means suitable for receiving the load applied to the system;
   linkage means extending between said base means and frame means for joining said base means and frame means together while permitting relative vertical movement between said base means and frame means, said linkage means comprising two spaced pairs of crossed links, adjacent members of said links being joined together in a manner permitting relative rotation between said links, the links of said pairs having one end rotatably mounted in one of said base means or frame means and the other end slidable along the other of said frame means or base means;
   mechanical spring means mounted on one of said base means and frame means;
   a lever coupled to said spring means for loading said spring means by arcuate movement of said lever, said lever having cam means thereon; and
   fulcrum means slidably mounted on said linkage means and engaging said lever and cam means, said fulcrum means being movable along said lever and arcuately moving said lever for changing the length of the arm of said lever and applying a preloading to said spring means, the spring rate (K) of said spring means being alterable by said fulcrum means in accordance with the applied load (W) to maintain the quantity (K/W) constant and provide a constant natural frequency to the suspension system.

* * * * *